Figure 1:
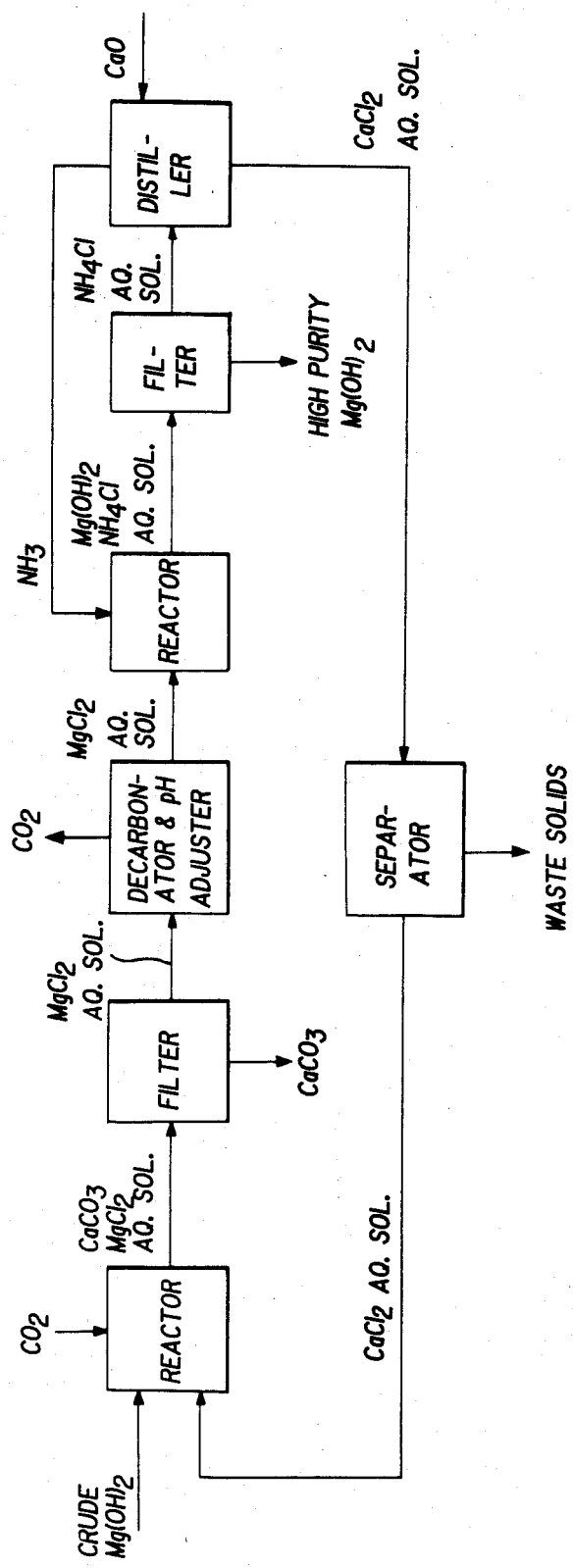

United States Patent [19]

Nakaya et al.

[11] Patent Number: 4,693,872
[45] Date of Patent: Sep. 15, 1987

[54] PROCESS FOR PRODUCING HIGHLY PURE MAGNESIUM HYDROXIDE

[75] Inventors: Keiichi Nakaya, Chiba; Kunio Tanaka, Ichihara, both of Japan

[73] Assignee: Asahi Glass Company Ltd., Tokyo, Japan

[21] Appl. No.: 693,159

[22] Filed: Jan. 22, 1985

[30] Foreign Application Priority Data

Jan. 20, 1984 [JP] Japan ................................... 59-7049

[51] Int. Cl.$^4$ ............................................. C01F 11/04
[52] U.S. Cl. ................................... 423/164; 423/165; 423/636; 423/638; 423/639
[58] Field of Search ............... 423/164, 165, 636, 638, 423/639

[56] References Cited

U.S. PATENT DOCUMENTS

| 1,197,512 | 9/1916 | Lord | 423/165 |
|---|---|---|---|
| 1,348,933 | 8/1920 | Dolbear | 423/638 |
| 1,986,509 | 1/1935 | MacIntire | 423/638 |
| 2,659,661 | 11/1953 | Keitel | 423/164 |
| 2,705,185 | 3/1955 | Kamlet | 423/164 |
| 3,393,976 | 7/1968 | Housh | 423/165 |
| 3,787,558 | 1/1974 | Briggs et al. | 423/164 |
| 4,497,781 | 2/1985 | Spoors et al. | 423/155 |
| 4,508,690 | 4/1985 | Obrist et al. | 423/173 |

FOREIGN PATENT DOCUMENTS 759773 11/1933 France.
799299 3/1936 France.
832227 6/1938 France.

OTHER PUBLICATIONS

Chemical Abstracts, vol. 102, No. 6, Feb. 1985, p. 139, No. 48209b, Columbus, OH; and RO-A-82 222 (D. Barzu et al.) 30-07-1983.

Primary Examiner—John Doll
Assistant Examiner—Wayne A. Langel
Attorney, Agent, or Firm—Oblon, Fisher, Spivak, McClelland, & Maier

[57] ABSTRACT

A process for producing highly pure magnesium hydroxide, which comprises reacting magnesium hydroxide starting material containing impurities, with an aqueous solution containing a water-soluble calcium salt and carbon dioxide to form an aqueous solution containing a magnesium salt and calcium carbonate precipitates whereby said impurities are transferred to the precipitates, filtering off the precipitates, then reacting the aqueous solution containing the magnesium salt, with ammonia to form a slurry comprising magnesium hydroxide solid and an aqueous solution containing an ammonium salt, and filtering the slurry to obtain highly pure magnesium hydroxide solid and an aqueous solution containing the ammonium salt.

12 Claims, 1 Drawing Figure

PROCESS FOR PRODUCING HIGHLY PURE MAGNESIUM HYDROXIDE

The present invention relates to a process for producing highly pure magnesium hydroxide, and particularly to a process for efficiently producing at a low cost magnesium hydroxide containing little impurities by using sea water as starting material.

Highly pure magnesium hydroxide is expected to be widely used as a starting material for fine ceramics or as medical or electronic materials.

Heretofore, magnesium hydroxide has been prepared from sea water as starting material by reacting it with milk of lime. However, such magnesium hydroxide contains substantial amounts of boric acid components, silica or alumina components, iron components, calcium components and the like derived from the sea water and/or milk of lime. Therefore, such magnesium hydroxide is not useful for the purpose of the above-mentioned high quality products.

On the other hand, there have been many attempts to obtain highly pure magnesium hydroxide since old time. For instance, a process has been proposed wherein sea water or a solution containing a magnesium salt such as bittern is treated with lime water or a highly pure alkali such as sodium hydroxide or ammonia. In either case, the alkali used is expensive, and the magnesium hydroxide product is obliged to be accordingly expensive.

The present inventors have conducted extensive researches with an aim to obtain highly pure magnesium hydroxide at a low cost from magnesium hydroxide from sea water, which is obtainable in great amounts at a relatively low cost. As a result, they have found a relatively simple treating method, whereby the above object can be attained.

Namely, the present invention provides a process for producing highly pure magnesium hydroxide, which comprises reacting magnesium hydroxide starting material containing impurities, with an aqueous solution containing a water-soluble calcium salt and carbon dioxide to form an aqueous solution containing a magnesium salt and calcium carbonate precipitates whereby said impurities are transferred to the precipitates, filtering off the precipitates, then reacting the aqueous solution containing the magnesium salt, with ammonia to form a slurry comprising magnesium hydroxide solid and an aqueous solution containing an ammonium salt, and filtering the slurry to obtain highly pure magnesium hydroxide solid and an aqueous solution containing the ammonium salt.

Namely, the present invention provides a process for producing highly pure magnesium hydroxide at a low cost by using magnesium hydroxide starting material containing impurities, which is obtainable from sea water at a relatively low cost, and quick lime and/or slaked lime, as raw materials.

Now, the present invention will be described in detail with reference to the preferred embodiments.

In the accompanying drawing, FIG. 1 is a flow chart illustrating a preferred embodiment of the process of the present invention.

In the present invention, as the water soluble calcium salt, there may be employed calcium chloride or calcium nitrate. Calcium chloride is preferred from the viewpoints of the availability of the material and economy. Now, the present invention will be described with reference to the preferred embodiment wherein calcium chloride is used as the water soluble calcium salt.

In the present invention, firstly, as a method for producing magnesium hydroxide starting material containing impurities, there may be employed a conventional method wherein sea water is, by itself or after decarbonation, reacted with calcium hydroxide such as milk of lime or carbide residuum.

The magnesium hydroxide thus obtained, contains, for instance, calcium components, boric acid components, silica or alumina components or iron components. In the present invention, the magnesium hydroxide starting material containing such impurities is reacted with an aqueous calcium chloride solution and carbon dioxide to form an aqueous magnesium chloride solution and calcium carbonate precipitates. By this reaction, the impurities contained in the magnesium hydroxide starting material, which are undesirable for the intended highly pure magnesium hydroxide product, can be transferred substantially completely to the resulting calcium carbonate precipitates.

Further, the magnesium hydroxide starting material containing impurities, obtained by the above-mentioned method, further contains sulfate groups in an amount of from about 1 to about 2% by weight as $SO_3$ (by dry weight).

The present inventors have found that during the process for the formation of the above-mentioned aqueous magnesium chloride solution and calcium carbonate precipitates, the sulfate group concentration in the resulting aqueous magnesium chloride solution can be reduced by employing the magnesium hydroxide starting material containing impurities and calcium chloride in a molar ratio of $CaO/MgO = 1.0-3.0$, preferably 1.1–1.6 as calculated as the respective oxides. Accordingly, the $SO_3$ concentration in the resulting highly pure magnesium hydroxide can be minimized.

When the molar ratio of $CaO/MgO$ is less than 1.0, magnesium components will remain in the above-mentioned calcium carbonate precipitates, whereby not only the magnesium components will be lost, but also the $SO_3$ concentration in the resulting highly pure magnesium hydroxide will exceeds 0.1%, such being undesirable. On the other hand, if the molar ratio of $CaO/MgO$ exceeds 3.0, the concentration of the resulting magnesium chloride decreases, such being undesirable.

It is usual that the aqueous calcium chloride solution is used in a concentration of from 5 to 50% by weight. Excess calcium chloride remains unreacted, and the unreacted calcium chloride brings about no problem for the subsequent reaction with ammonia, and will not be lost so long as it is recycled as will be described hereinafter. If necessary, for the purpose of lowering the slurry concentration during the reaction, an aqueous magnesium chloride solution separated in the subsequent step from calcium carbonate, may be recycled to this reaction system.

Carbon dioxide used simultaneously may be blown in an adequate amount to change the magnesium hydroxide starting material to magnesium chloride. As the carbon dioxide, there may be employed carbon dioxide having a concentration of from 10 to 40% generated during the sintering of lime stone or dolomite, or highly pure carbon dioxide recovered from e.g. an ammonia plant.

Reaction temperature is usually from 20° to 80° C. The resulting calcium carbonate precipitates are filtered off from the aqueous magnesium chloride solution by means of a proper conventional method. For instance, there may be employed a proper method such as filtration under reduced pressure or filtration under pressure, as the filtration method.

The calcium carbonate thus obtained corresponds to a so-called precipitated calcium carbonate prepared by blowing carbon dioxide into milk of lime, and it is useful as a reinforcing filler for rubbers and plastics, or for inks, paints and paper making. It is possible to obtain particles having a uniform particle size by properly selecting the precipitation rate, the addition of seed crystals or the use of a multi-stage reactor.

Then, it is preferred to conduct decarbonation by adding e.g. hydrochloric acid or nitric acid to the aqueous magnesium chloride solution separated from the calcium carbonate precipitates and containing, in some cases, excess calcium chloride to bring the solution acidic at a level of a pH of 1 to 5 and conducting aeration to remove carbonic acid ions dissolved in the aqueous magnesium chloride solution or calcium carbonate precipitates leaked during the filtration. If the crystallization of magnesium hydroxide from a magnesium chloride solution is conducted without the decarbonation, it is likely that a very small amount of calcium carbonate will be included in the resulting magnesium hydroxide, whereby it will be difficult to obtain highly pure magnesium hydroxide.

Further, if necessary, for the purpose of removing impurities such as sulfuric acid ions, boron, iron or alumina, which remain in extremely small amounts in the above-mentioned magnesium chloride solution, it is possible to employ a conventional method for the purification of a magnesium chloride-containing solution, such as an addition of an agent for the formation of hardly soluble precipitates, a pH control to form hardly soluble precipitates followed by filtration and removal, or passing the solution through an ion exchange resin. Then, ammonia is reacted with a solution containing magnesium chloride thus obtained, to form magnesium hydroxide precipitates and an aqueous ammonium chloride solution. The concentration of magnesium chloride is preferably from 3 to 40% by weight, more preferably from 5 to 25% by weight. If the concentration is less than 3%, the energy required for the reaction system tends to increase. On the other hand, the upper limit for the concentration is determined in view of the difficulty in handling or the selection of the material for the apparatus.

The ammonia for the reaction, is usually directly blown into a solution containing magnesium chloride, in the form of a gas. However, if desired, it may be used in the form of aqueous ammonia. In this step, magnesium chloride will not completely be converted to magnesium hydroxide precipitates, and partially remains as magnesium chloride. However, if the remaining magnesium chloride is recycled for reuse as will be described hereinafter, it will not be lost, and it will not bring about any trouble for the subsequent reaction with slaked lime and/or quick lime followed by distillation. The ammonia is employed in an amount of from 1 to 3.5 equivalents relative to one equivalent of magnesium chloride. If the amount of ammonia is less than the above range, the yield of magnesium hydroxide substantially decreases. On the other hand, if the amount of ammonia exceeds the above range, the energy required for the recovery of excess ammonia increases.

The temperature for the reaction of the aqueous magnesium chloride solution with ammonia is usually from 20° to 80° C.

Further, at the time of the above reaction, the particle size of magnesium hydroxide can be optionally controlled to any desired level ranging from fine crystals of submicrons to coarse particles of 500 $\mu$m or more, by properly selecting the precipitation rate or the supersaturation degree of magnesium hydroxide, the slurry concentration, the degree of agitation, or the amount and particle size of seed crystals. For instance, fine crystals of submicrons may be obtained by reacting the aqueous solution containing magnesium chloride with ammonia by instantaneous mixing without back mixing, for instance, by means of a line mixer or an ejector. On the other hand, a coarse particulate product may be obtained by reacting magnesium chloride with ammonia at a slurry concentration of from 1 to 60% by weight, preferably from 3 to 40% by weight under a crystallization load at a level of from 5 to 500 kg/m$^3$.hr, preferably from 30 to 120 kg/m$^3$.hr under stirring.

In the case where a product having an intermediate particle size is desired, it is possible to obtain crystals having any desired particle size by conducting crystallization of magnesium hydroxide by blowing ammonia into the reactor while supplying the magnesium chloride solution and the reaction solution containing fine crystals prepared by the above-mentioned method, to the reactor, and properly adjusting the proportions of the above reaction solution and the magnesium chloride solution.

The magnesium hydroxide thus formed is separated from the aqueous ammonium chloride solution by a suitable means such as a pressure filtration machine or a vacuum filtration machine, thoroughly washed and dried at a temperature of from 100° to 200° C. to obtain a product. On the other hand, the aqueous solution containing unreacted magnesium chloride, ammonium chloride, etc., is reacted with slaked lime and/or quick lime in such an amount that substantially no magnesium hydroxide will precipitate and then distilled by a conventional method to recover ammonia gas. When the recovered ammonia contains carbon dioxide generated e.g. by the decomposition of calcium carbonate contained in the slaked lime and/or quick lime, the recovered ammonia may be washed with e.g. an aqueous sodium hydroxide solution to remove carbon dioxide, and then recycled for reuse in the magnesium hydroxide-forming reaction step.

The amount of the quick lime and/or slaked lime for the decomposition of ammonium chloride is controlled so that unreacted magnesium chloride remaining in the ammonium chloride solution does not substantially precipitate as magnesium hydroxide, whereby not only it is possible to prevent an unnecessary loss of magnesium ions, but also it is possible to suppress the formation of scales in the distillation apparatus. Thus, the amount of the quick lime and/or slaked lime is preferably selected within a range of from 50 to 105%, preferably from 80 to 100%, relative to the reaction equivalent with ammonium chloride. If the amount of the quick lime and/or slaked lime is less than the above-mentioned lower limit, the yield of magnesium hydroxide decreases, such being disadvantageous for an industrial process.

On the other hand, the slurry comprising calcium chloride formed by the reaction of the ammonium chloride with the quick lime and/or slaked lime, unreacted magnesium chloride, ammonium, solid impurities contained in the slaked lime and/or quick lime and excess slaked lime and/or magnesium hydroxide solid, is, in some cases, concentrated by a concentrating apparatus such as an evaporator to a necessary concentration, and then recycled for reuse in the magnesium chloride-forming step, by itself or after removing the above-mentioned solid impurities and excess slaked lime and/or magnesium hydroxide solid by means of e.g. filtration. Further, if necessary, for the purpose of removing dissolved impurities such as iron and alumina dissolved in the above-mentioned solution containing calcium chloride, prior to the above-mentioned filtration operation, it is possible to add an agent for forming hardly soluble precipitates.

In the highly pure magnesium hydroxide obtained by the process of the present invention, the above-mentioned impurities are contained in an amount of only from 0.01 to 0.9% by weight in total. Accordingly, it is useful practically for all purposes where a high purity product is required.

Now, the present invention will be described in further detail with reference to Examples. However, it should be understood that the present invention is by no means restricted by these specific Examples.

EXAMPLE 1

FIG. 1 shows a flow diagram illustrating this Example.

Sea water was subjected to decarbonation treatment in a usual manner and then treated with milk of lime in a conventional manner to obtain a magnesium hydroxide slurry. This slurry was subjected to separation by vacuum filtration. The magnesium hydroxide thereby obtained was a wet cake having a MgO concentration of 34.0% by weight and containing 0.41% by weight of CaO, 0.12% by weight of $SiO_2$, 0.12% by weight of $Al_2O_3$, 0.03% by weight of $Fe_2O_3$, 0.09% by weight of $B_2O_3$ and 1.0% by weight of $SO_3$, as impurities. To 1 kg of such a magnesium hydroxide wet cake, 6.55 kg of aqueous solution containing 20.0% by weight of calcium chloride and 2.0% by weight of magnesium chloride, was added and mixed, and then 0.19 $Nm^3$ of carbon dioxide having a concentration of 100% was reacted and absorbed at a temperature of 60° C. The molar ratio of the magnesium hydroxide starting material to the calcium chloride was CaO/MgO=1.4. The reaction product was filtered by a filtration machine to obtain 0.84 kg of solid calcium carbonate and 7.1 kg of an aqueous solution containing 12.7% by weight of magnesium chloride. The aqueous magnesium chloride solution was acidified to pH 4 with hydrochloric acid and subjected to aeration to carry out decarbonation treatment. Then, 0.72 $Nm^3$ of ammonia gas was blown into the aqueous solution at a temperature of 40° C., whereby 0.46 kg of magnesium hydroxide precipitates and 7.2 kg of an aqueous solution containing 11.9% by weight of ammonium chloride, were obtained. The magnesium hydroxide precipitates were separated by a filtration machine, washed with water and then dried at 140° C. The magnesium hydroxide thereby obtained, contained 68.7% by weight of MgO, 0.06% by weight of CaO, 0.04% by weight of $SiO_2$, 0.01% by weight of $Al_2O_3$, 0.001% by weight of $Fe_2O_3$, 0.09% by weight of $B_2O_3$ and 0.01% by weight of $SO_3$, thus satisfying the standard requirements for the starting material for fine ceramics.

On the other hand, to the aqueous solution containing ammonium chloride, 0.47 kg of quick lime was added, and the mixture was subjected to distillation, whereby 0.71 $Nm^3$ of ammonia gas and an aqueous solution containing 20.0% by weight of calcium chloride and 2.0% by weight of magnesium chloride, were obtained. The aqueous solution containing calcium chloride was subjected to filtration by a filtration machine to separate the precipitates and to obtain a clear solution. These materials may be recycled for reuse in the operation of the present invention.

EXAMPLE 2

After reacting the magnesium hydroxide containing impurities, the aqueous calcium chloride solution and the carbon dioxide in the same proportions as in Example 1, the calcium carbonate was separated to obtain an aqueous solution containing 12.7% by weight of magnesium chloride. The aqueous solution and ammonia gas were continuously supplied to a reactor maintained under an adequately agitated condition by means of an agitation apparatus and containing magnesium hydroxide crystals as seed crystals in a ratio of 0.10 $Nm^3$ of ammonia gas relative to 1 kg of the aqueous solution, whereby magnesium hydroxide crystals precipitated. The crystallization load of magnesium hydroxide was 40 $kg/m^3$.hr, and the slurry concentration was 6% by weight.

The resulting slurry containing magnesium hydroxide was continuously withdrawn, and the magnesium hydroxide was separated by a filtration machine, washed with water and then dried at 140° C. The magnesium hydroxide thereby obtained was in the form of generally spherical particles having an average particle size of 30 $\mu$m. The product was excellent magnesium hydroxide having good flowability. The product contained substantially the same levels of impurities as in Example 1.

EXAMPLE 3

The aqueous magnesium chloride solution having a concentration of 12.7% by weight obtained in the same manner as in Example 2 and ammonia gas were reacted by instantaneously contacting and absorbing ammonia gas to the aqueous magnesium chloride solution in a ratio of 0.11 $Nm^3$ of ammonia gas to 1 kg of the aqueous solution, whereby magnesium hydroxide precipitated. The resulting slurry containing magnesium hydroxide was separated by a filtration machine, and the magnesium hydroxide was washed with water, and dried at 140° C. The magnesium hydroxide thereby obtained was fine crystals having an average particle size of 0.9 $\mu$m. The magnesium hydroxide contained impurities substantially in the same amount as in Example 1.

What is claimed is:

1. A process for producing highly pure magnesium hydroxide, which comprises the steps of:
reacting magnesium hydroxide starting material containing impurities, with an aqueous solution containing a water-soluble calcium salt and carbon dioxide to form an aqueous solution containing a magnesium salt and calcium carbonate precipitates whereby said impurities are transferred to the precipitates,
filtering off said precipitates,
decarbonating said filtered aqueous solution at a pH of from 1-5,
reacting said decarbonated aqueous solution containing said magnesium salt, with ammonia to form a slurry comprising magnesium hydroxide solid and an aqueous solution containing an ammonium salt, and filtering the slurry to obtain highly pure magnesium hydroxide solid and an aqueous solution containing said ammonium salt.

2. The process according to claim 1, wherein the aqueous solution containing an ammonium salt is an aqueous solution comprising an ammonium salt, ammonia and an unreacted magnesium salt.

3. The process according to claim 1, wherein in the reaction of the magnesium salt with ammonia, the equivalent ratio of the magnesium salt to ammonia is within a range of 1:1 to 1:3.5.

4. The process according to claim 1, wherein the aqueous solution containing the ammonium salt is reacted with slaked lime and/or quick lime and distilled to obtain ammonia and an aqueous solution containing the formed calcium salt.

5. The process according to claim 1, wherein the aqueous solution containing the ammonium salt is reacted with slaked lime and/or quick lime in such an amount that substantially no precipitate of magnesium hydroxide forms, and distilled to obtain an ammonia and a slurry comprising the formed calcium salt, the unreacted magnesium salt, the ammonium salt, solid impurities contained in the slaked lime and/or the quick lime, and excess slaked lime and/or magnesium hydroxide solid.

6. The process according to claim 5, wherein the slurry comprising the formed calcium salt, the unreacted magnesium salt, the ammonium salt, the solid impurities of the slaked lime and/or the quick lime, and excess slaked lime and/or magnesium hydroxide solid, is recycled as the calcium salt for the reaction with the magnesium hydroxide starting material containing impurities, after or without removing said solid impurities and excess slaked lime and/or magnesium hydroxide solid.

7. The process according to claim 1, wherein the calcium salt, the magnesium salt and the ammonium salt are calcium chloride, magnesium chloride and ammonium chloride, respectively.

8. The process according to claim 1, wherein the calcium salt, the magnesium salt and the ammonium salt, are calcium nitrate, magnesium nitrate and ammonium nitrate, respectively.

9. The process according to claim 1, wherein in the reaction for the formation of calcium carbonate, the ratio of the magnesium hydroxide starting material containing impurities to the water-soluble calcium salt is $CaO/MgO = 1.0$–$3.0$ as a molar ratio based on the respective oxides.

10. The process according to claim 1, wherein in the reaction for the formation of magnesium hydroxide, ammonia and the aqueous solution containing the magnesium salt are reacted at a crystallization load of magnesium hydroxide of from 5 to 500 $kg/m^3 \cdot hr$ at a slurry concentration of from 1 to 60% by weight under thorough stirring, whereby coarse magnesium hydroxide crystals having good flowability are obtained.

11. The process according to claim 1, wherein in the reaction for the formation of magnesium hydroxide, ammonia and the aqueous solution containing the magnesium salt are catalytically reacted by instantaneous mixing without back mixing, whereby fine magnesium hydroxide crystals of an order of submicrons are obtained.

12. The process according to claim 1, wherein the magnesium hydroxide starting material containing impurities is obtained from sea water.

* * * * *